Patented Sept. 26, 1950

2,523,483

UNITED STATES PATENT OFFICE 2,523,483

PRESERVED YEAST PRODUCTS

Morris Stern, Detroit, Mich.

No Drawing. Application March 14, 1947,
Serial No. 734,861

15 Claims. (Cl. 99—94)

The present invention relates to the preservation of yeast. The invention also relates to novel materials containing live dried yeast, and to methods of preparation of such materials.

Although various means have been proposed in the past for preventing the deterioration of yeast to enable it to be stored over long periods of time, there has not heretofore been found, insofar as I am aware, a practical method whereby yeast can be preserved for considerable periods of time without loss of potency, under conditions which prevent further growth thereof, without using special containers, while making it possible for the ultimate user to incorporate the yeast in baked goods or other food products quickly and easily, at the termination of storage, without the necessity for any special treatment of the preserved yeast in order to render it again active.

It is accordingly an object of the present invention to provide improved means whereby dried, live yeast may be so protected and preserved that its potency as a fermenting agent remains virtually undiminished over long periods of time. It is further an object of this invention to provide such preserving means which permits the preserved yeast to be employed as a fermenting agent in a conventional manner similar to the method employed in the use of wet yeast in baking, and which is simpler than present methods employed in using dry yeast, without special treatment and without introducing into the baked goods or other food products to be leavened any adulterant or preservative material which is of a nature foreign to ordinary wholesome food materials conventionally employed in baking processes.

A further object is to provide improved yeast products having the indicated characteristics.

Another object of the present invention is to provide a novel food product consisting of dried yeast preserved in shortening or in other wholesome fatty material of a relatively stable character (such as hydrogenated vegetable oil), the combined preserved yeast and shortening material being adapted to be incorporated with other ingredients to form a dough which may be mixed to conventional proportions without, as above stated, introducing any foreign materials whatever into the final food product. Finished baked goods corresponding in every way to those prepared with fresh yeast may thus be prepared with fresh yeast may thus be prepared more easily and quickly than has heretofore been possible.

Still another object is to provide an improved prepared flour of dry and stable character, containing active dried yeast evenly distributed therethrough in the form of small particles, the yeast particles being so effectively preserved as to resist deterioration over considerable periods of time and the flour being adapted to be rendered self-leavening, simply by the addition of water.

Other objects and advantages will be apparent upon consideration of the present disclosure in its entirety.

I have found that yeast may be effectively preserved by utilizing as the preservative a conventional shortening material, preferably of a relatively stable type which resists deterioration without refrigeration and which does not turn rancid even over long periods of time. Preferably also, the shortening material is one which is of a substantially solidified fatty character at the ordinary temperatures encountered in storage. Hydrogenated vegetable oil is a very suitable material for the purpose, although I believe my invention to be of such scope that it should not be restricted to the particular material indicated, and of course, the keeping qualities of the shortening are of importance primarily only in their effect upon the keeping qualities of the yeast. There are now available other shortening materials which I have found to work satisfactorily. Among these are a form of lard or animal fat which has been treated, probably by hydrogenating, to increase its stability, and mixtures of vegetable and animal fats. The dried yeast is granulated, as by rolling, to a size such that each granulated particle contains one or more undamaged yeast cells. Although yeast of the character known in the trade as "dried" feels dry to the touch and is externally dry, at least superficially, it is live yeast, as previously noted, and so presumably contains intro-cellular moisture. The granules may be of about the size of ordinary granulated sugar particles and care is taken not to heat the yeast to a damaging degree during the rolling. The granulated yeast is then mixed with the fat. This may be done either by hand or with an ordinary cake mixer or equivalent mixing device, and the shortening may be either melted or in the solid condition. If it is in the melted state, its temperature must of course be low enough to avoid injuring the yeast at the time of mixing. Only a few minutes of the mixing treatment is required, since its only purpose is to insure that each yeast granule is completely covered with the fat. If melted shortening is used, it is possible to obtain complete coverage of ordinary dried yeasts by mixing the yeast and fat in such proportions that the weight of the shortening is equal to or greater than approximately 10% of the total weight of the yeast and shortening. Even lesser quantities of fat may be used, and a preservative benefit will be obtained so long as an impervious coating surrounds the yeast particles, but I prefer to use a coating of sufficient thickness to guard against the danger of rubbing off. Melted shortening in the proportion of 20% of the total is very satisfactory in this respect. When solid shortening is used easy and thorough coverage of the yeast particles by the fat can be obtained by employing shortening in the proportion of about one third of the total, by weight. Of course any greater proportion of fat may be used with equally good results insofar as preservation of the yeast is concerned.

The yeast particles coated in the indicated manner may be kept in any suitable container— preferably a container which is formed of or treated internally with a material substantially impervious to fat.

A yeast-fat mixture of the character above described may be kept for long periods of time and utilized, when desired, to serve as a leavening agent for baked goods, or for any other use to which yeast is ordinarily applied where fat or shortening is also desired to be incorporated or unobjectionable in the finished product. Since most yeast-leavened baked goods would not be harmed by a slight extra quantity of shortening, the shortening which is incorporated with the yeast may be disregarded insofar as the recipe is concerned; although, if the greatest economy is desired or it is desired to adhere strictly to a recipe, the amount of shortening incorporated separately may of course be reduced by the amount which is added with the yeast, or the desired final proportion of shortening may be incorporated with the yeast as the preservative in the manner above disclosed.

When the preserved yeast is to be put to use and activated, the dough-moistening agent, such as water, is preferably added warm, and it quickly melts the fat from the yeast, freeing the yeast particles from their enclosing fat layers and permitting the yeast to commence fermentation in the usual manner. All of the fats and shortening materials referred to will of course melt in warm or hot water. I have also found that much hotter water may be used in mixing dough with my preserved yeast than with ordinary unprotected yeast, and the temperature of the water is much less critical. This is apparently due to the protective character of the coating which surrounds each yeast particle. It will be noted that I have not recommended forming a yeast sponge, as is generally required when using dry yeast. I have found that this is not necessary when using dried yeast preserved with fat in accordance with my invention; and this will be recognized as another important benefit and simplification flowing from my invention.

When granulated dry yeast is first mixed with shortening in the above-described manner, the yeast-shortening mixture may be blended with flour in a uniformly distributed manner in an ordinary flour blending machine. If ordinary dried yeast having no preservative coating is simply mixed with flour, the yeast deteriorates even faster than it would if stored alone, and such a yeast-flour product is entirely impractical in a commercial sense. The rapid deterioration of unprotected yeast mixed with flour is apparently due to the fact that the flour is not actually entirely dry, and the yeast acquires enough moisture from the flour to cause the yeast to deteriorate with great rapidity. When my fat-preserved yeast is mixed with flour, however, the yeast is protected against such deteriorating influences, although the flour remains similar in general appearance to other prepared flours, for all practical puposes and may be shipped, stored, and treated as, and actually feels like, a dry product. Ordinary flour containers may be used. If a flour of the fully prepared variety is desired, other ingredients such as sugar, salt, etc., may be added, and all of the dry ingredients are premixed before the preserved yeast is added. The operation of the blending machine disperses the yeast particles, which separate from one another and become uniformly distributed through the flour, although each particle retains a fat coating which shields it against access of air and effectively prevents deterioration of the yeast for considerable periods of time. Under ordinary storage conditions it has been found in actual tests that yeast incorporated in flour in this manner suffers no observable deterioration in potency when stored for periods up to one year, whereas yeast which is not so preserved declines rapidly in potency within a few weeks.

If a yeast shortening mix is to be promptly blended with flour in the indicated manner, I have found that relatively unstable fats, such as rendered beef fat or other animal fat, may be used, and when incorporated with the flour and yeast, the fat is effectively preserved against deterioration also. This may be due to the drying effect of the flour upon the unstable fat, and/or some other protective effect of the flour which surrounds each coated yeast particle, although I have not determined the correctness of this explanation and of course should not be bound by it.

While the yeast shortening mix may be blended with flour alone, my present invention also makes it possible to prepare and store completely prepared special purpose flours, which may contain dried milk, dried eggs, a full quantity of shortening and of course any other desired suitable ingredients in addition to the yeast. It will be apparent, however, that no moisture of a character which might penetrate the yeast coating should be included, although all other ingredients necessary to form a sweet dough may be present, and the nature of the constituents and the manner of preservation of the yeast are such that by the simple addition of warm or hot water a sweet yeast mixed dough is formed, and the yeast, rendered active by the water in the presence of sugar, at once commences to ferment and leavens the mix in the same manner as if fresh yeast were incorporated in the usual manner at the time of mixing the water with the dry ingredients.

A suitable flour composition, which is illustratively indicated as one adapted for doughnuts, may include 2½ lbs. dried yeast, mixed in the above manner with 6 lbs. 12 oz. of shortening, and blended into the dry ingredients, which may comprise:

| | |
|---|---|
| Sugar | lbs 9 |
| Egg yolks, dried | lbs 1 |
| Milk powder, dried | ozs 8 |
| Salt | lbs 1 |
| White wheat flour | lbs 75 |

It will be recognized that the foregoing prepared flour mix is illustrative only and affords an indication of one of the important uses of my present invention in that it enables the combining of the preserved yeast with flour and other ingredients to form a completely ready, self-leavening prepared flour which may be packaged and stored in warehouses and on the shelves of grocery stores, for practicable lengths of time, in a dry condition. This of course effects an important simplification to the ultimate consumer, and an economy of time and reduction of costs, since yeast-leavened baked goods may be prepared much more quickly and simply than is now possible.

It will also be apparent that various modifications may be made without departure from the fair and intended scope of the invention as set forth in the appended claims.

I claim:

1. As a new article of manufacture, a preserved yeast product comprising granulated live dried yeast, each granule of which is surrounded and enclosed by a coating of relatively stable fatty shortening.

2. An article as defined in claim 1 in which the shortening comprises not less than 10% by weight.

3. As a new article of manufacture, a preserved yeast product comprising live dried yeast particles which individually incorporate at the surface thereof a preservative comprising relatively stable fatty shortening.

4. An article as defined in claim 3 wherein said shortening comprises hydrogenated vegetable oil.

5. The process of preserving dried yeast which comprises granulating dried live yeast to form particles of a size such that each particle contains one or more undamaged yeast cells and coating the particles with a stable fatty shortening material.

6. The process of preserving yeast which comprises applying stable fatty shortening material to all of the external surfaces of live dried granulated yeast particles.

7. The process of preserving dried yeast, which comprises granulating dried live yeast and coating the same with a completely enclosing layer of stable fatty shortening material.

8. The process defined in claim 7 wherein the shortening material comprises hydrogenated vegetable oil.

9. The process of compounding a prepared flour which comprises granulating live dried yeast, applying fatty shortening material to the external surfaces of the yeast particles, and incorporating such particles in a flour in such manner as to tend to separate the particles and distribute them throughout the flour by mechanically working the treated particles together with the flour.

10. As a new article of manufacture, a yeast product consisting of a plurality of superficially dried live yeast particles enclosed in and rendered coherent by a relatively stable fatty protective shortening material which can be melted from enclosing relation with respect to such yeast by water.

11. As a new article of manufacture, a self-leavening flour having dispersed therein a plurality of particles of live dried granulated yeast, each particle incorporating at its external surface a fatty shortening coating.

12. An article as defined in claim 11 in which said coating comprises rendered animal fat.

13. An article as set forth in claim 11 in which said coating comprises a relatively stable shortening material.

14. An article as set forth in claim 11 in which said coating comprises a relatively unstable shortening material.

15. As a new article of manufacture, a flour adapted for baking and the like, containing distributed therethrough a plurality of small particles of dried live yeast, each particle being surrounded and enclosed by an adherent coating of relatively unstable fatty shortening material, the coated yeast particles being in turn surrounded by the flour, whereby the shortening material may protect the yeast against deterioration and the flour may in turn protect the shortening against deterioration.

MORRIS STERN.

REFERENCES CITED

The following references are of record in the file of this patent:

UNITED STATES PATENTS

| Number | Name | Date |
|---|---|---|
| 1,042,647 | Castle | Oct. 29, 1912 |
| 1,546,820 | Ballard et al. | July 21, 1925 |
| 1,625,121 | Hildebrandt et al. | Apr. 19, 1927 |
| 1,633,711 | Prince | June 28, 1927 |
| 1,667,895 | Johnson | May 1, 1928 |
| 1,944,880 | Finkel | Jan. 30, 1934 |
| 2,223,465 | Schultz et al. | Dec. 3, 1940 |

FOREIGN PATENTS

| Number | Country | Date |
|---|---|---|
| 421,707 | Germany | Nov. 17, 1925 |